UNITED STATES PATENT OFFICE.

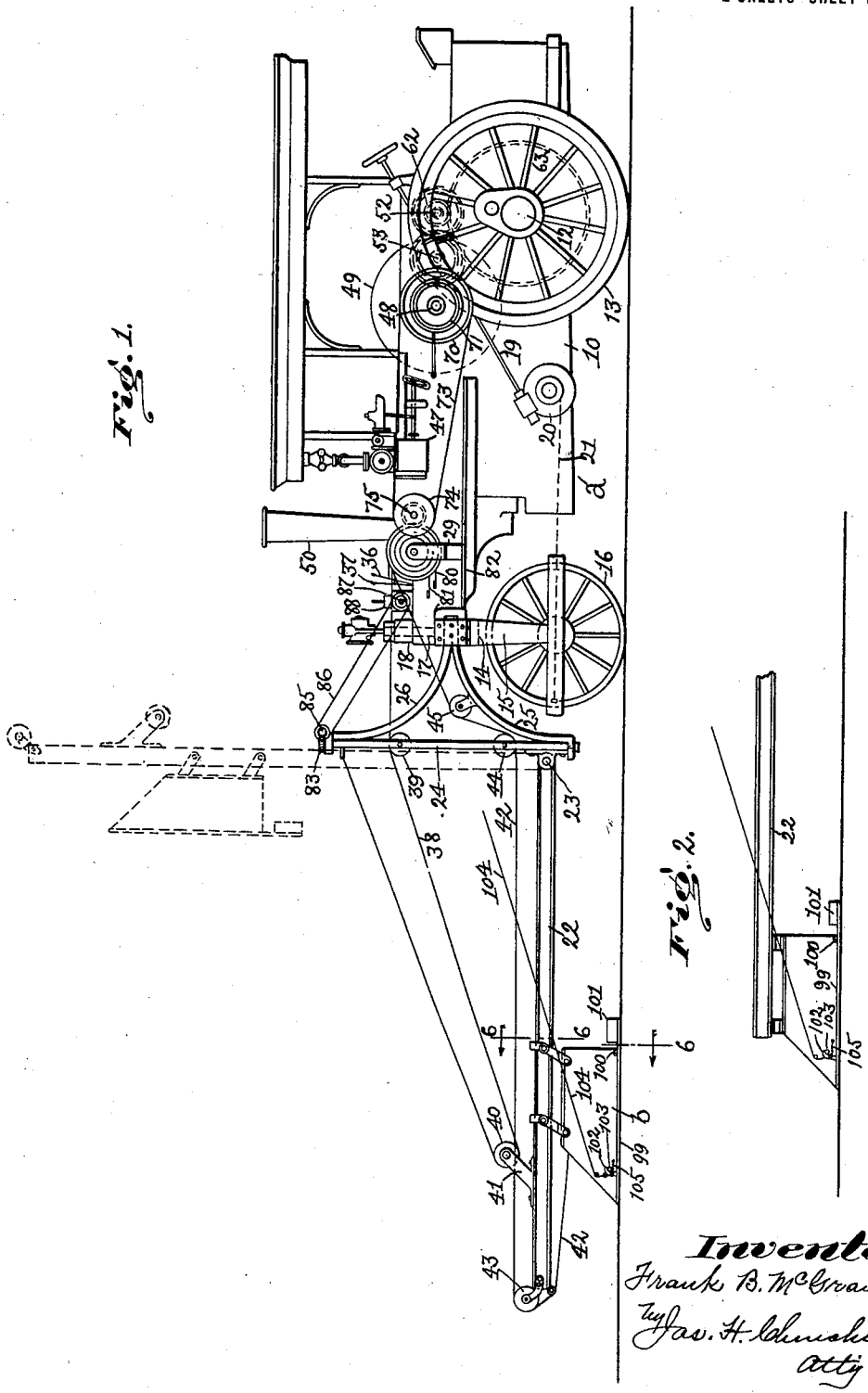

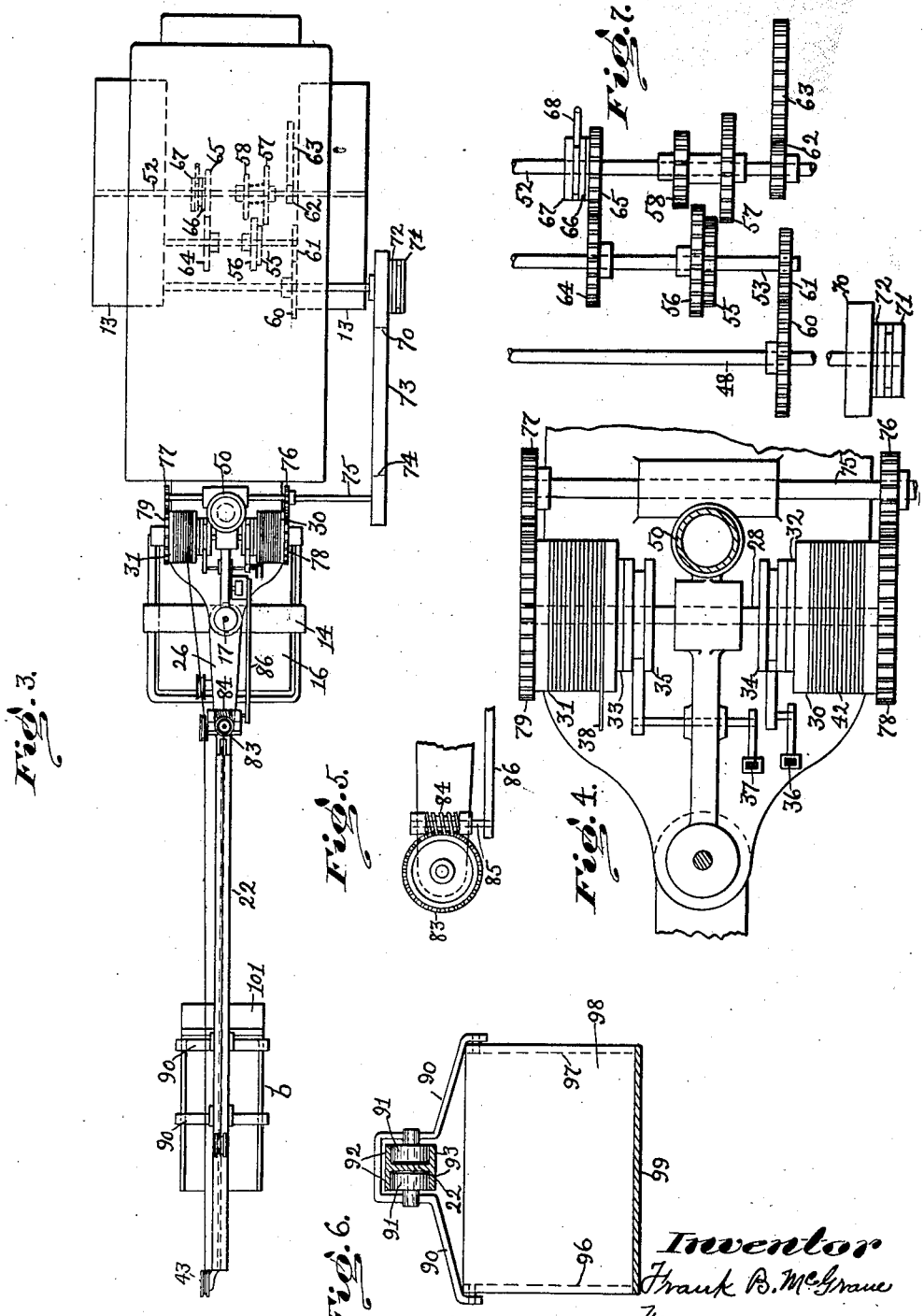

FRANK B. McGRANE, OF SOMERVILLE, MASSACHUSETTS.

COMBINATION ROAD-VEHICLE.

1,316,374.  Specification of Letters Patent.  Patented Sept. 16, 1919.

Application filed February 2, 1917, Serial No. 146,233. Renewed August 11, 1919. Serial No. 316,837.

*To all whom it may concern:*

Be it known that I, FRANK B. McGRANE, a citizen of the United States, residing in Somerville, in the county of Middlesex and State of Massachusetts, have invented an Improvement in Combination Road-Vehicles, of which the following description, in connection with the accompanying drawings, is a specification, like characters on the drawings representing like parts.

This invention relates to a power operated vehicle for performing work on roads, highways and like places, and has for its object to provide a combination vehicle with which different kinds of work may be performed at a minimum cost.

The invention is adapted to be embodied in a combination vehicle having a member for rolling the road or way and also a member for removing material from the road or way, and provision is made for operating said members separately or jointly from the motor carried by and employed to propel the vehicle, as will be described.

The member employed to roll the road or way may be designated the roller, and the member employed for removing material from the road or way in front of the vehicle may be designated the excavator.

Provision is made for elevating the excavator when loaded and for swinging it to either side of the vehicle by power under control of an operator on the vehicle.

The excavator may and preferably will be of novel construction, which is capable of being actuated to discharge its load by the operator on the vehicle.

These and other features of this invention will be pointed out in the claims at the end of this specification.

Figure 1 is a side elevation of a combination road vehicle embodying this invention.

Fig. 2, a detail showing a modified form of excavator.

Fig. 3, a plan of the vehicle shown in Fig. 1.

Fig. 4, an enlarged detail of parts shown in Fig. 3.

Fig. 5, a detail of the device for swinging the excavator.

Fig. 6, an enlarged section taken on the line 6—6, Fig. 1, and

Fig. 7, a detail of the power transmission mechanism employed on the vehicle.

Referring to the drawing, *a* represents a power operated vehicle for working on roads, ways and like places, which is shown as a vehicle commonly known as a road roller, and comprises in the main a body portion 10 mounted at its rear end upon an axle 12 provided with traction wheels 13, which are located at opposite sides of the body portion *a*. The front end of the body portion *a* is supported by the cross bar 14 of a yoke-shaped frame or saddle 15, which extends transversely of the body portion *a* and carries the axis of a roller 16 of substantial width, which serves as the front support for the road vehicle and also as the member with which the road or other way is rolled down. The yoke-shaped frame 15 is provided with an upright spindle or pivot 17, which has a bearing in a boss 18 on the front end of the body portion 10 to enable the frame 15 and the roller 16 to be turned about the spindle 17 as a center by a worm shaft 19, worm gear 20 and link chains 21, as now commonly practised in road rolling machines of this character now in use for the specific purpose of rolling down roads.

The present invention has for its object to provide a road rolling machine of the type described, with a member capable of performing another kind of work, and in the present instance the member referred to is shown as a shovel or scoop *b*, which is designed to remove material from the road or way, either in building a new road or way or in rebuilding an old road or way, and which member may for convenience be designated an excavator. The excavator *b* is carried by a boom 22, pivoted at 23 to the lower end of a rotatable upright or mast 24, which is journaled at its upper and lower ends in a stationary frame, rigidly secured to the front end of the road vehicle *a*. The stationary frame referred to may and preferably will be made as herein shown and comprises two arms 25, 26, which project in front of the roller 16, and the lower arm 25 is curved and separated from the roller 16 a sufficient distance to permit the latter to be turned in manipulating the road vehicle *a*. The upper arm 26 may also be curved if desired.

Provision is made for turning the boom 22 on its pivot and for turning the upright 24, by power which is controlled by an operator on the vehicle *a*, and to this end, the front portion of the vehicle *a* supports suitable mechanism for this purpose. In the present instance the front portion of the vehicle *a* supports a drum shaft 28, which extends transversely of said front portion and is suitably journaled at its ends.

The shaft 28 may be journaled in suitable brackets 29 attached to opposite sides of the front portion of the road vehicle a, and is provided as herein shown with two drums 30, 31, normally loose on said shaft but adapted to be rendered fast thereon by clutches of any known or desired construction. In the present instances, I have illustrated more or less conventionally two clutches, comprising members 32, 33, secured to the drums 30, 31, and members 34, 35, movable on the shaft 28 but secured thereto to rotate therewith. The clutch members 34, 35, are designed to be operated from one side of the road roller or vehicle a, which may be effected by levers 36, 37, see Fig. 1, which are operatively connected with said clutch members in any suitable or well known manner.

One of the drums as 31 is designed to have wound upon it a wire cable, chain or the like, 38, which is employed to elevate the boom 22, and which is shown in Fig. 1 as passed over a pulley 39 carried by the rotatable upright 24 and under a pulley 40 carried by a bracket or arm 41 on the boom, and attached to the upright 24. The other drum 30 is used when the excavator b is movable on the boom 22 as represented in Fig. 1, wherein a cable, chain or the like 42, has one end connected with the excavator b and is passed over a pulley 43 carried by the boom 22 at its free end, and then is passed under a pulley 44 carried by the rotatable upright 24, over a pulley 45 carried by the arm 25 of the supporting frame for the boom, and has its end secured to the drum 30 to be wound thereon. The drum shaft 28 is operatively connected with the motor employed to propel the road roller or vehicle a. In the present instance, the road roller a is represented as provided with a motor in the form of a steam engine as is usual in this type of vehicle, which engine is conventionally represented by the cylinder 47, the crank shaft 48 driven thereby, and the fly wheel 49 on said crank shaft. The steam engine is supplied with steam from a boiler carried by the vehicle a and represented herein by the smoke stack 50. Provision is made whereby the steam engine or motor carried by the vehicle a, is employed to propel the vehicle a, and to turn the winding drums 30, 31, and work the excavator b and boom 22, either while the vehicle a is in motion or at rest. To this end, the engine is provided with a transmission system, which can be manipulated to propel the vehicle, or to manipulate the excavator or boom while the vehicle is in motion or at rest.

In the present instance, I have represented in Fig. 7, one construction or arrangement of transmission for effecting this result.

Referring to Fig. 7, 48 represents the crank shaft of the engine, 52 a shaft which is operatively connected with the rear wheels 13 of the vehicle, and 53 a shaft which is intermediate the crank shaft 48 and the vehicle driving shaft 52. As shown in Fig. 7, the intermediate shaft 53 is provided with gears 55, 56, with which cooperate gears 57, 58, on the shaft 52. The gears 57, 58, are capable of being moved from their neutral position shown in Fig. 7, in one direction to engage the gears 57, 55, and cause the engine or motor to propel the road roller a at one speed, and the gears 57, 58, are moved in the opposite direction to engage the gears 58, 56, and cause the engine or motor to propel the road roller a at a different speed. When the gears 57, 58, are in their neutral position shown in Fig. 7, they are out of mesh with the gears 55, 56, and the vehicle a is at rest while the engine continues to run.

The intermediate shaft 53 is driven from the crank shaft 48 of the motor by gears 60, 61, and the shaft 52 is geared to the wheels 13 of the vehicle by gears 62, 63. The shaft 52 is geared to the shaft 53 by the gears 64, 65, the latter gear being normally loose on the shaft 52 and adapted to be rendered fast thereon by a clutch of any usual or suitable construction, and which is conventionally represented as a member 66 fast to the gear 65, and a member 67 mounted on the shaft 52 to rotate therewith and to slide thereon. The clutch member 67 may be moved by a shipper or clutch rod 68 or in any other suitable or desired manner. By means of the clutch 66, 67, the road roller a may be propelled without necessitating stopping the engine to shift the gears 57, 58, for a purpose as will be described.

The crank shaft 48 is provided with a pulley 70, which is normally loose thereon and adapted to be rendered fast to said shaft by a clutch member 71 cooperating with a clutch member 72. The pulley 70 is connected by a belt 73, see Fig. 1, with a pulley 74 on a shaft 75, having pinions 76, 77, which mesh with gears 78, 79, fast on the drum shaft 28, see Fig. 4.

By shifting the gear 57 or 58 into mesh with the gear 55 or 56, the road roller is positively driven by the crank shaft 48, and by throwing on the clutch member 71, the pulley 70 is also revolved and drives the drum shaft 28, so that the excavator b may be made to work at the same time the roller 16 is at work, and consequently the apparatus can be performing two different kinds of work at the same time if desired.

By moving the change gears 57, 58 to their neutral position, the vehicle can be stopped, and when at rest its function as a road roller ceases, but its function as an excavator may be continued with the movable excavator shown in Fig. 1, for in this case, by throwing in the clutch member 71, the drum shaft 28 is driven from the crank shaft 48 and the excavator $b$ may be caused to travel on the boom by clutching the winding drum 30 to the shaft 28, and by clutching the drum 31 to the shaft 28, the loaded excavator $b$ may be elevated and held in its elevated position by suitable band brakes 80, 81, represented in Fig. 1 and which are such as commonly used on the drums of hoisting machinery.

The band brake 81 which coöperates with the drum 31 serves to hold the boom in its elevated position, and the band brake 80 which coöperates with the drum 30 serves to hold the excavator stationary on the boom, and by releasing the latter band brake, the excavator can run down the elevated boom to its starting or normal position. By releasing the band brake 81, the boom can return to its normal or horizontal position.

Provision is made for swinging the boom by power accessible to the operator manipulating the drums 30, 31, and who may stand on a platform 82 extended from one side of the front portion of the vehicle $a$. To this end, the rotatable upright 24 has fast on it a worm gear 83, see Figs. 1 and 5, which is rotated by a worm 84 on a shaft 85 connected by a belt or link chain 86 with the shaft 87 of a reversible steam engine 88 supported by the front portion of the vehicle $a$.

By running the engine 88 in one direction, the shaft or upright 24 can be rotated in one direction to swing the boom 22 to one side of the vehicle $a$, and by reversing the said engine, the boom can be swung to the other side of the vehicle.

In the present instance I have shown one arrangement for supporting the excavator on the boom while the excavator travels lengthwise of the boom, and to this end, the excavator is provided with straps or yokes 90, see Figs. 1 and 6, which straddle the boom 22 and carry rollers 91, which are confined between upper and lower flanges 92, 93, on the boom, which is herein shown in the form of an I-beam.

In operation with the combination vehicle shown in Fig. 1, the excavating member $b$ can be operated at the same time that the rolling member 16 is operating, or the excavating member can be elevated and held in this position while the rolling member 16 alone is being used, or the rolling member 16 can be rendered inoperative by having the vehicle stationary and the excavating member alone used.

It may be preferred to use an excavating member which travels on the boom 22, but it is not desired to limit the invention in this respect, as the said member may be secured in fixed relation to the boom as represented in Fig. 2. In this latter case, the winding drum 30 may be dispensed with, while the other drum 31 is retained for elevating the boom. When the stationary excavator $b$ is used, it is moved forward to perform its work by moving the road roller forward, which is effected in this instance by the operator throwing in the clutch member 67, which renders the gear 65 fast on the shaft 52. It will be understood that when the stationary excavator is used and the road roller $a$ is employed to push it forward, the change gears 57, 58, are in their neutral position, and the crank shaft 48 is connected with the rear wheels through the gears 60, 61, shaft 53, gears 64, 65, (the clutch member 67 being in engagement with the clutch member 66) the shaft 52 and gears 62, 63. The clutch member 67 is preferably a friction clutch member, which enables the operator on the road roller to control to a nicety the forward movement of the road roller and excavator. The excavating member may be of any desired construction, but it is preferred to make it of the construction herein shown, and which is provided with side walls 96, 97, having their front ends downwardly inclined, a rear wall 98 and a movable bottom wall 99, which latter is pivoted at 100 to the side walls and has its rear portion extended beyond the rear wall 98 and provided with a counter-weight 101. The bottom wall 99 is capable of turning on its pivot 100 so as to open the excavator and permit the load to be dumped when the excavator is in an elevated position. Provision is made for locking the front end of the bottom wall 99 in its closed position represented in Fig. 1, and to this end the bottom wall carries a pivot or latch 102 at one and preferably at both sides, each of which is adapted to engage a stationary pin 103 extended from the side wall of the excavator. The latch 102 is capable of being disengaged from its coöperating pin 103 by a cord 104 extended to the front portion of the vehicle $a$, where it is accessible to the operator on the platform 82, who manipulates the winding drums. The latch 102 is normally held in engagement with the pin 103 by a spring 105.

I have herein represented the invention as embodied in a road roller having one form of motor, namely a steam engine, but it is not desired to limit the invention to a road roller provided with this particular form of motor.

Prior to this invention I am aware that road rollers alone have been used for rolling roads, such as Macadam roads and the like, and as soon as this particular work has been performed, the vehicle is out of commission. So also I am aware that vehicles provided with an excavator have been employed for excavating purposes, but so far as I am aware a combination vehicle capable of being used as a road roller *per se*, or as an excavator *per se*, or to perform both kinds of work at the same time if desired, has not been made. In the present instance I have shown one form or construction of excavator but it is not desired to limit the invention to the particular construction of excavator herein shown.

Claims:

1. In a vehicle of the character described, in combination, a road roller having a body portion supported at its rear end by traction devices and at its front end by a roller pivotally mounted, a motor carried by said body portion, gearing for connecting said motor with said traction devices, a stationary frame secured to the said body portion above said roller and projecting in front of said roller and having an upright member separated from said roller by a space to permit said roller to turn, a rotatable upright mounted on the upright member of said stationary frame, a boom pivoted to said upright to project in front thereof and to be moved vertically, an excavator mounted on said boom to travel lengthwise thereof, winding drums carried by the body portion of said road roller at the rear of the pivot for said roller, flexible connections between said winding drums and said boom and excavator, means for connecting said winding drums with the motor of said road roller, and means for controlling the connection of the winding drums with said motor to permit the said drums to be operated by said motor when the road roller is at rest.

2. In a vehicle of the character described, in combination, a road roller having a body portion supported at its rear end by traction devices and at its front end by a roller pivotally mounted, a motor carried by said body portion, gearing for connecting said motor with said traction devices, a stationary frame secured to the said body portion above said roller and projecting in front of said roller and having an upright member separated from said roller by a space to permit said roller to turn, a rotatable upright mounted on the upright member of said stationary frame, a boom pivoted to said upright to project in front thereof and to be moved vertically, an excavator carried by said boom, a winding drum carried by the body portion of said road roller at the rear of the pivot for said front roller, a flexible connection between said winding drum and said boom, and means for connecting said winding drum with the motor of said road roller.

3. In a vehicle of the character described, in combination, a motor propelled vehicle provided at one end with a pivoted saddle carrying a rotatable member which supports the vehicle at said end, a supporting frame secured in fixed relation to the vehicle above the saddle and having a portion located in front of the vehicle substantially in the longitudinal center of the same and having an upper portion extended above the point of attachment to the vehicle and a lower portion extended below said point of attachment and upwardly and rearwardly from the lower end thereof to said point of attachment, whereby said frame overhangs said vehicle in front thereof and has its lower portion separated from said saddle to permit the rotatable member to turn with the saddle, an upright mast rotatably mounted in the upright member of said frame, a boom carried by said mast to rotate therewith and pivoted to move vertically, and a winding drum supported by said vehicle and operatively connected with the motor of the vehicle and with said boom for operating the latter.

4. In a vehicle of the character described, in combination, a motor propelled vehicle, a supporting frame secured in fixed relation to the vehicle and having a portion located in front of the vehicle substantially in the longitudinal center of the same and having an upper portion extended above the point of attachment to the vehicle and a lower portion extended below said point of attachment, an upright mast rotatably mounted in said overhanging frame, a boom pivoted to move vertically and carried by said mast to rotate therewith, a movable bucket carried by said boom, a winding drum supported by said vehicle independently of said frame and operatively connected with the motor of the vehicle and with said bucket and boom.

5. In a vehicle of the character described, in combination, a motor propelled vehicle, a supporting frame secured in fixed relation to the vehicle and having a portion located in front of the vehicle substantially in the longitudinal center of the same and having an upper portion extended above the point of attachment to the vehicle and a lower portion extended below said point of attachment, means for connecting the upper and lower portions of the frame in front of the vehicle, a boom carried by said frame and pivoted to the lower portion thereof to move vertically and a winding drum supported by the vehicle independently of said frame and operatively connected with the motor of the vehicle and with said boom.

In testimony whereof, I have signed my name to this specification.

FRANK B. McGRANE.

Copies of this patent may be obtained for five cents each, by addressing the "Commissioner of Patents, Washington, D. C."